(No Model.)
2 Sheets—Sheet 2.

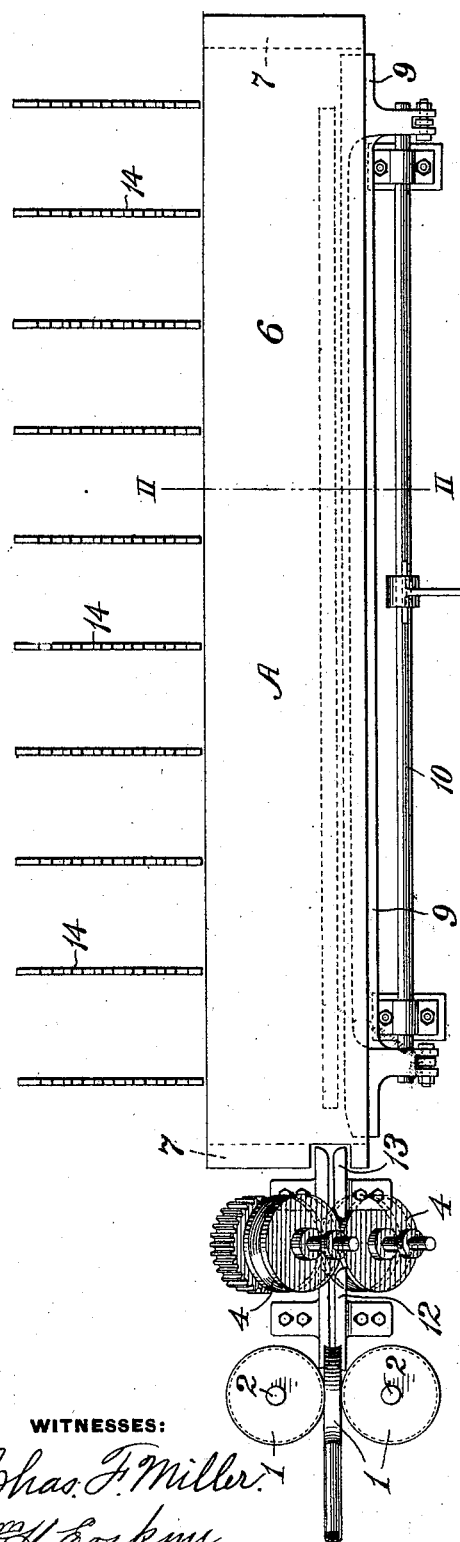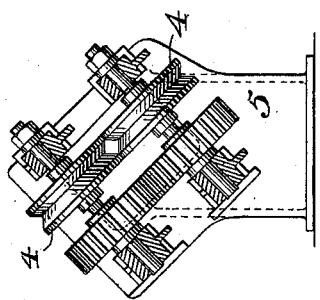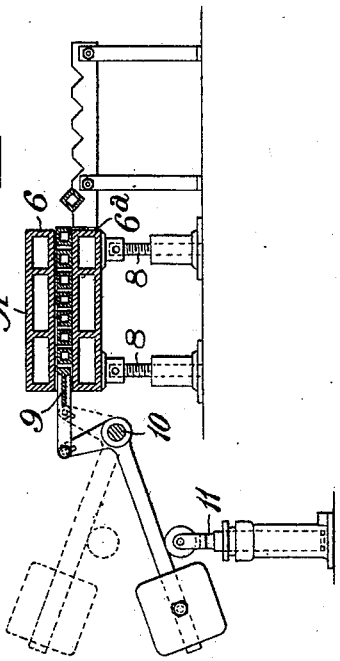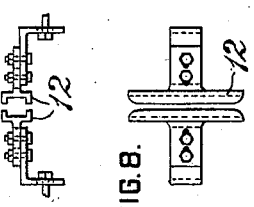

P. BOYD.
APPARATUS FOR MANUFACTURING ANGULAR PIPE.

No. 581,228. Patented Apr. 20, 1897.

WITNESSES:
Chas. F. Miller.
Wm. H. Erskine

INVENTOR.
Peter Boyd
by Darwin S. Wolcott
Att'y.

UNITED STATES PATENT OFFICE.

PETER BOYD, OF WHEELING, WEST VIRGINIA, ASSIGNOR TO THE RIVERSIDE IRON WORKS, OF SAME PLACE.

APPARATUS FOR MANUFACTURING ANGULAR PIPE.

SPECIFICATION forming part of Letters Patent No. 581,228, dated April 20, 1897.

Application filed November 3, 1896. Serial No. 610,942. (No model.)

*To all whom it may concern:*

Be it known that I, PETER BOYD, a citizen of the United States, residing at Wheeling, in the county of Ohio and State of West Virginia, have invented or discovered a certain new and useful Improvement in Apparatus for the Manufacture of Angular Pipe, of which improvement the following is a specification.

My improvement relates to the class of apparatus for the manufacture of angular pipe wherein round pipe is reduced to pipe of any desired angle by being passed between rolls provided upon their peripheral surfaces with grooves of such shape that when the rolls are arranged in proper relation to each other the pass formed thereby will correspond approximately in contour to that of the desired article.

The object of my invention is to provide an apparatus whereby round pipe may be reduced to pipe of any desired angular cross-section by a single pass between rolls arranged and adjustably supported at such an angle relatively to each other as to form a pass of the desired shape, the stand of rolls in turn being capable of adjustment at any angle, so that the finished pipe may be delivered therefrom in whatever position desired.

A further object of my invention is to provide means whereby the finished pipe, after emerging from between the rolls in a heated condition, may be supported until it has cooled sufficiently to be handled without becoming twisted or otherwise distorted.

Figure 3:
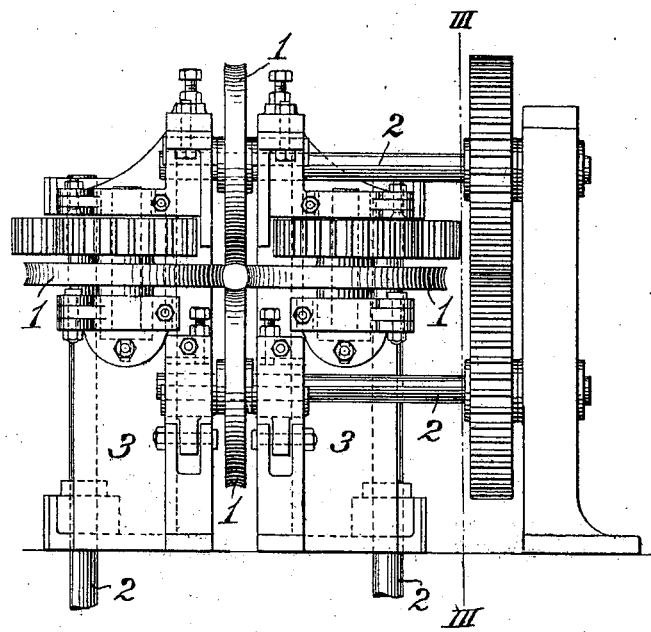
Figure 4:
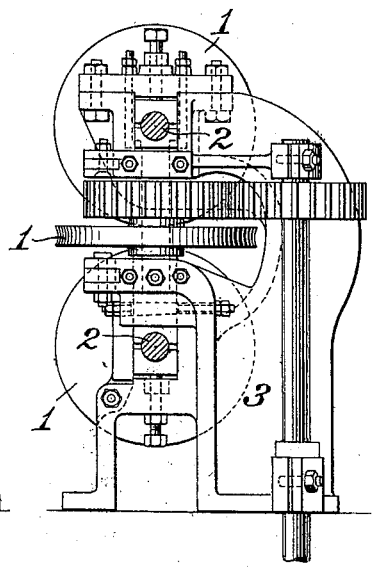
Figure 5:
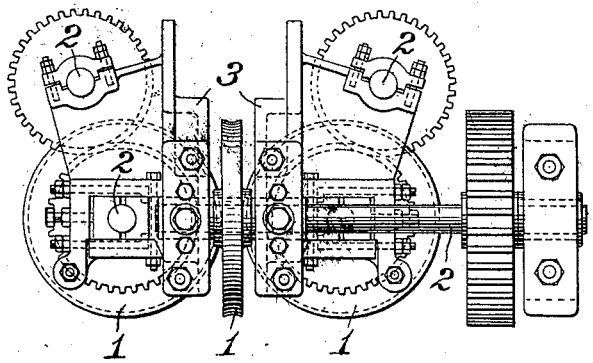

In the accompanying drawings, which illustrate my invention, Figure 1 is a plan view of my improved apparatus; Fig. 2, a transverse section on the line II II of Fig. 1 through the cooling-bed, illustrating the method in which the finished tubes are supported while cooling; Fig. 3, a front elevation, on an enlarged scale, of the shaping-rolls; Fig. 4, a vertical longitudinal section of the same on the line III III of Fig. 3; Fig. 5, a plan view of the same; Fig. 6, a view, partly in section and partly in elevation, of the finishing-rolls; and Figs. 7 and 8, an end elevation and plan, respectively, of the guides interposed between the rolls and cooling-bed.

In the practice of my invention I provide four rolls 1, arranged in pairs, the rolls of one pair having their axis at or about right angles to those of the other pair. The journals 2 of the rolls are supported in adjustable bearings mounted in upright supports or housings 3, motion being imparted to the said rolls by any suitable driving mechanism. The housing 3, in which the rolls are supported, may be set at any desired angle in order that pipe having a square section may be delivered therefrom either with the corner or flat side up, but for convenience in describing my invention I have shown the same with the rolls set in the latter position—that is to say, with one pair rotating in a horizontal and the other pair in a vertical plane, the central axis of all four rolls being preferably in line with each other. The bearings in which the shafts 2 rotate are capable of adjustment to and from a common center in order to accommodate different sizes of rolls and compensate for any wearing away of the rolls themselves.

A pair of finishing or sizing rolls 4, provided with approximately square grooves and mounted in a suitable housing 5, are interposed between the rolls 1 and the cooling-bed A, to be presently described. The axis of these finishing-rolls is set at or about an angle of forty-five degrees to that of the rolls 1, in order to prevent twisting of the article being rolled and at the same time remove any traces of fins, &c., which might appear thereon. While the use of these finishing-rolls insures pipe true to size, and I prefer to use them in combination with rolls 1 and cooling-bed A, they may, if so desired, be dispensed with and the apparatus still be capable of doing effective work.

The cooling-bed or straightening-machine A is located adjacent to the finishing-rolls 4 and in line therewith and consists of two rectangular plates 6 and 6ª, located one above the other a sufficient distance apart to allow the finished pipe to pass between them upon emerging from the rolls. Said plates 6 and 6ª are secured together at their ends by means of two transverse end pieces 7 and rest upon adjustable supports 8. The plates 6 and 6ª are constructed to permit of their being cooled by water or other suitable means. As shown in the drawings, the plates are made hollow for the circulation of water therethrough, or, if preferred, water may be admitted to the space between said plates directly on the pipe. A movable bar 9, of a length nearly equal to the distance between the inner faces of the end pieces 7, is located and is free to move transversely between the upper and lower plates 6 and 6ª, motion being imparted to said bar, when desired, by any suitable mechanism, as, for example, by an arm on a rock-shaft 10, and hydraulic jack 11, operating on a second arm.

The operation of my improved apparatus is as follows: Round pipe of the desired diameter is heated to the proper degree and then fed between the rolls 1, where it is reduced to approximately the desired angular section. It then passes through guides 12, formed of two channel-irons, to the finishing-rolls 4; thence through a guide 13, similar to guide 12, to the cooling-bed or straightening-machine A. The pipe is delivered from the rolls 4 between the cooling-plates 6 and 6ª. It is then pushed to one side by means of the movable bar 9 a sufficient distance to make room for the next pipe, for which it acts as a side guide. The movable bar is then pulled back and forms a guide for the other side of said pipe as it is delivered from the rolls. This operation is repeated with the delivery of each pipe until the space between the cooling-plates is filled, when the first pipe delivered is forced out from between the cooling-plates, and, being cold enough to handle without twisting, is either placed upon the usual V-shaped cooling-rack 14 or delivered upon a truck, as may be desired.

From the foregoing it will be observed that the pipe after entering between the rolls 1 is not handled, twisted, or turned until it emerges from the cooling-bed, when it is in a condition to be handled without fear of injury.

I claim as my invention and desire to secure by Letters Patent—

1. The combination in an apparatus for forming pipe of any angular cross-section, of shaping-rolls and a cooling-bed arranged in the line of feed of said rolls and constructed to bear upon two or more sides of the pipe fed thereinto, and thereby prevent any twisting or distortion of the pipes during cooling, substantially as set forth.

2. The combination in an apparatus for forming pipe of any angular cross-section, of two plates arranged a distance apart corresponding to the width of the pipe, and means for shifting the pipe transversely between said plates, substantially as set forth.

3. The combination in an apparatus for forming pipe of any angular cross-section, of two plates arranged a distance apart corresponding to the width of the pipe and means for cooling said plates, and means for shifting the pipes between the plates, substantially as set forth.

4. The combination in an apparatus for forming pipe of any angular cross-section, of two hollow plates arranged one above the other, a distance apart corresponding to the width of the pipe, transverse end pieces connecting said plates together, means for supporting the whole, and a cooling-rack located adjacent thereto, substantially as set forth.

5. The combination in an apparatus, for forming pipe of any angular cross-section, of two plates arranged one above the other a distance apart corresponding to the width of the pipe, a bar interposed between said plates, and means for moving said bar transversely between the plates, substantially as set forth.

In testimony whereof I have hereunto set my hand.

PETER BOYD.

Witnesses:
AMELIA LEONHART,
J. F. PAULL.